(12) United States Patent
Joeckel

(10) Patent No.: US 7,537,185 B2
(45) Date of Patent: May 26, 2009

(54) SWIVELING BEVERAGE HOLDER

(76) Inventor: Kevin L. Joeckel, 6685 SW. 162nd Dr., Beaverton, OR (US) 97007

( * ) Notice: Subject to any disclaimer, the term of this patent is extended or adjusted under 35 U.S.C. 154(b) by 403 days.

(21) Appl. No.: 11/083,493

(22) Filed: Mar. 18, 2005

(65) Prior Publication Data
US 2005/0236531 A1 Oct. 27, 2005

Related U.S. Application Data

(60) Provisional application No. 60/554,629, filed on Mar. 18, 2004.

(51) Int. Cl.
A47F 5/12 (2006.01)

(52) U.S. Cl. .................. 248/133; 248/105; 248/312; 220/741

(58) Field of Classification Search .............. 248/121, 248/126, 127, 103, 128, 130, 133, 143, 176.1, 248/176.3, 226.11, 231.81, 312, 312.1, 315, 248/311.2, 102, 105, 106, 311.3; 220/741; 366/197
See application file for complete search history.

(56) References Cited

U.S. PATENT DOCUMENTS

| 2,397,059 | A | * | 3/1946 | Swank | 248/105 |
|---|---|---|---|---|---|
| 3,627,244 | A | * | 12/1971 | Nicholas | 248/103 |
| 3,842,981 | A | * | 10/1974 | Lambert | 211/74 |
| 3,897,722 | A | * | 8/1975 | Harris | 99/345 |
| 4,359,786 | A | * | 11/1982 | Rosberg et al. | 4/144.1 |
| 4,498,613 | A | * | 2/1985 | Donahue et al. | 224/251 |
| 4,819,843 | A | * | 4/1989 | Nakayama | 224/553 |
| 5,129,610 | A | * | 7/1992 | Campbell | 248/106 |
| 5,152,489 | A | * | 10/1992 | Christensen et al. | 248/311.2 |
| 5,316,251 | A | * | 5/1994 | McGraw | 248/210 |
| 5,484,129 | A | * | 1/1996 | Megal | 248/311.2 |
| 5,720,456 | A | * | 2/1998 | Szybura | 248/126 |
| 5,775,654 | A | * | 7/1998 | Price | 248/231.61 |
| 5,853,158 | A | * | 12/1998 | Riggle | 248/311.2 |
| 6,216,605 | B1 | * | 4/2001 | Chapman | 108/26 |
| 6,964,398 | B1 | * | 11/2005 | Faulkner | 248/213.2 |
| 2004/0222345 | A1 | * | 11/2004 | Lindsay | 248/311.2 |
| 2006/0065801 | A1 | * | 3/2006 | Anderson | 248/311.2 |

* cited by examiner

*Primary Examiner*—J. Allen Shriver, II
*Assistant Examiner*—Bradley H Duckworth
(74) *Attorney, Agent, or Firm*—Marger Johnson & McCollom, PC

(57) ABSTRACT

Embodiments of the invention prevent beverage spills by retaining a beverage container in a swiveling device that provides the ability to upright itself when not in use. Embodiments of the invention further prevent dropping of beverage containers by retaining the beverage container in a swiveling device that holds the beverage container securely while the beverage is being consumed.

20 Claims, 9 Drawing Sheets

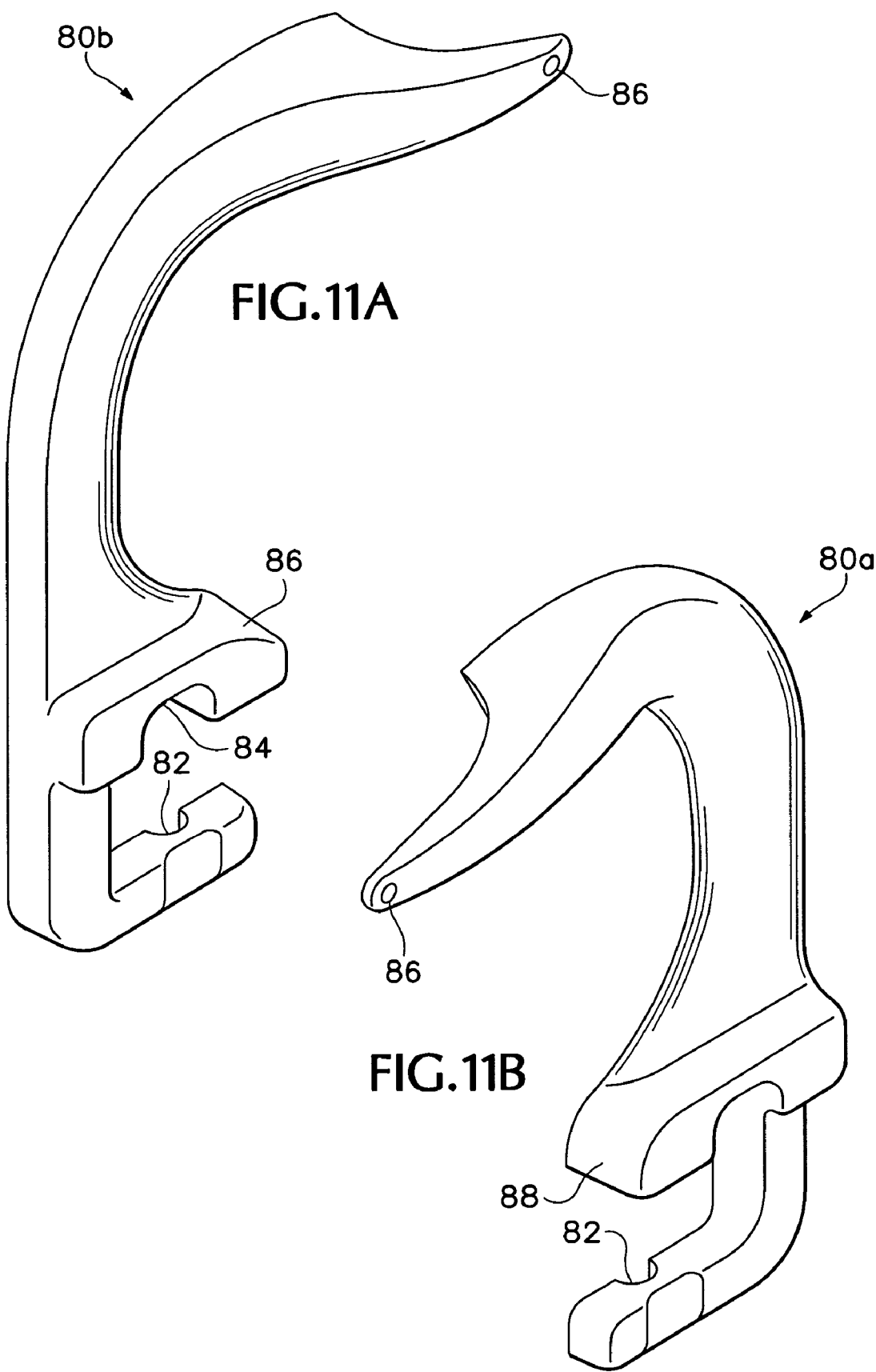

US 7,537,185 B2

SWIVELING BEVERAGE HOLDER

CROSS REFERENCE TO RELATED APPLICATIONS

This application claims the benefit of U.S. Provisional Application No. 60/554,629, filed 18 Mar. 2004, the disclosure of which is hereby incorporated by reference in its entirety.

BACKGROUND OF THE INVENTION

1. Technical Field of the Invention This disclosure relates to devices designed to facilitate the feeding of individuals with developing or limited motor skills, and in particular, to a swiveling beverage holder that prevents a beverage container from being dropped.

2. Description of the Related Art

People with limited mobility or skills tend to often spill beverages. Babies and children, for example, generally have less developed gross and fine motor skills than do typical adults. Disabled persons or people with other challenges may also not have full muscle control, adequate eyesight, and/or hand eye coordination to prevent beverage spills.

Developers have addressed the problem, but not fully. Bottles and so-called "sippy" cups exist for babies and children that generally remain sealed when tipped. Even when these containers are knocked down or even inverted, most of the liquid remains in the container. Although these containers may prevent the spilling of liquids, it does not prevent dropping or otherwise losing control of the container. Oftentimes children, such as children buckled in high chairs, cannot get down from the high chair and retrieve their dropped bottle.

Other solutions, such as bottle holders mounted to a frame or tray are typically rigid, un-moveable, and are difficult to apply to a variety of conditions.

Embodiments of the invention address these and other deficiencies in the prior art.

BRIEF DESCRIPTION OF THE DRAWINGS

FIG. 11A is an isometric view of one half of the frame assembly component of the beverage holder of FIG. 6.

FIG. 11B is an isometric view of the other half of the frame assembly component of the beverage holder of FIG. 6.

DETAILED DESCRIPTION OF THE INVENTION

Embodiments of the invention prevent beverage spills by retaining a beverage container in a swiveling device that provides the ability to upright itself when not in use. Embodiments of the invention further prevent dropping of beverage containers by retaining the beverage container in a swiveling device that holds the beverage container securely while the beverage is being consumed. Additionally, a frame supporting the swiveling device may be completely adjustable in multiple directions.

Figure 1:
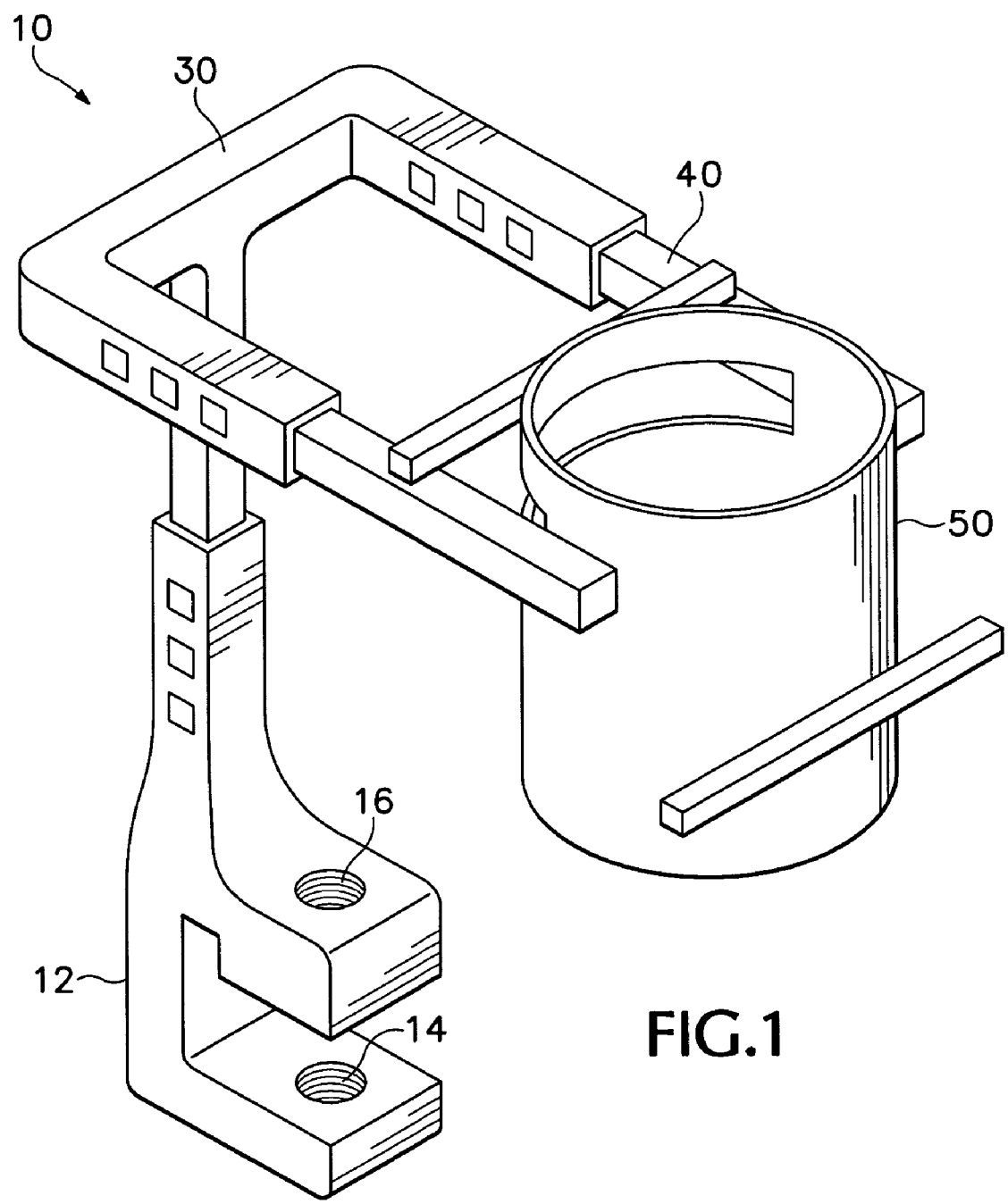
FIG. 1 is an isometric view of an adjustable, swiveling beverage holder according to some embodiments of the invention.

FIG. 1 is an isometric view of a swiveling beverage holder according to some embodiments of the invention, generally indicated at 10. The major components of the holder 10 include a lower frame member 12, a telescoping support frame 30, a telescoping cup support 40, and a swiveling cup 50. Individual components and the interaction of the components are described in more detail below.

In operation, the holder 10 is mounted to a support (not shown), such as a table, tray, stroller, or any other acceptable support. The holder 10 may be adjusted both in the vertical and horizontal directions to best suit the user. A swiveling cup 50 is mounted in the holder 10, and supports a bottle, cup, or other beverage container (not shown). The swiveling cup 50 pivots due to the placement of swivel pins so that it returns to a normal, upright position when no forces are pushing on it. As used in this description, the term "beverage container" refers to a cup, bottle, can, or other container that contains the beverage within it. Beverage containers are moveable or portable and may be inserted into the swiveling cup 50 of the holder 10.

Figure 2:
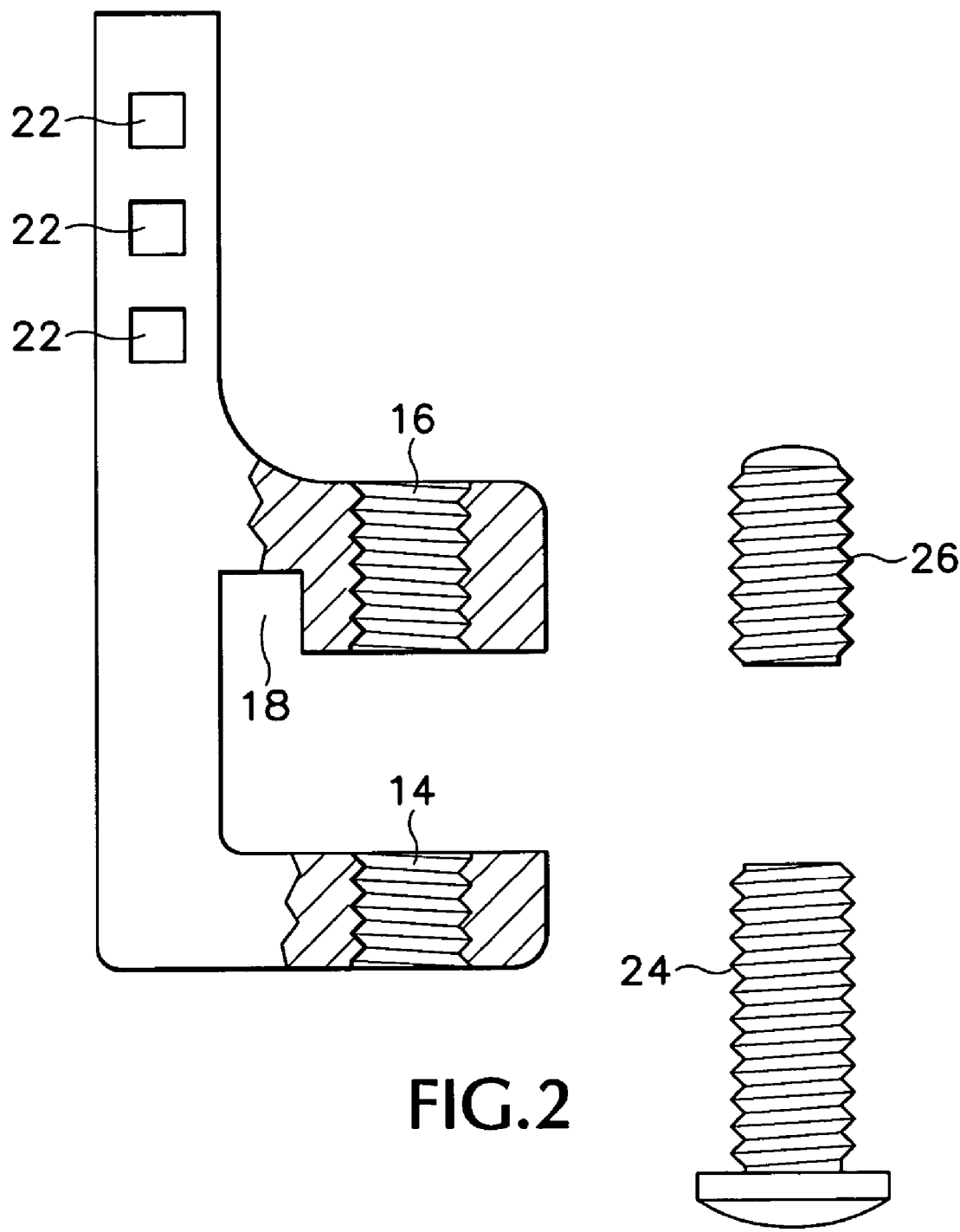
FIG. 2 is a sectional cutaway side view of a lower portion of a frame mount component of the beverage holder of FIG. 1.

With reference to FIG. 2, illustrated is a lower portion of a frame 12. The lower frame 12 includes a lower threaded hole 14, an upper threaded hole 16, and a set of adjustment holes 22. Bolts 24 and 26 insert into the threaded holes 14, 16, respectively, to firmly attach the holder 10 to a surface. A channel 18 allows the lower frame 12 to be mounted over a surface having a lip, such as a tray attachment of a high chair. The bolt 24 permits full vertical adjustment for different surface depths. The bolt 26 may be threaded into the upper hole 16 to hold the frame 12 to the surface from above. By tightening the bolts 24, 26 in their respective holes, the frame 12 is firmly held in place. In most embodiments, the bolt 26 is at a minimum flush with top of the upper hole 16, and can be adjusted into a recessed condition that eliminates the ability of a child to loosen and dislodge the bolt 26.

Figure 3:
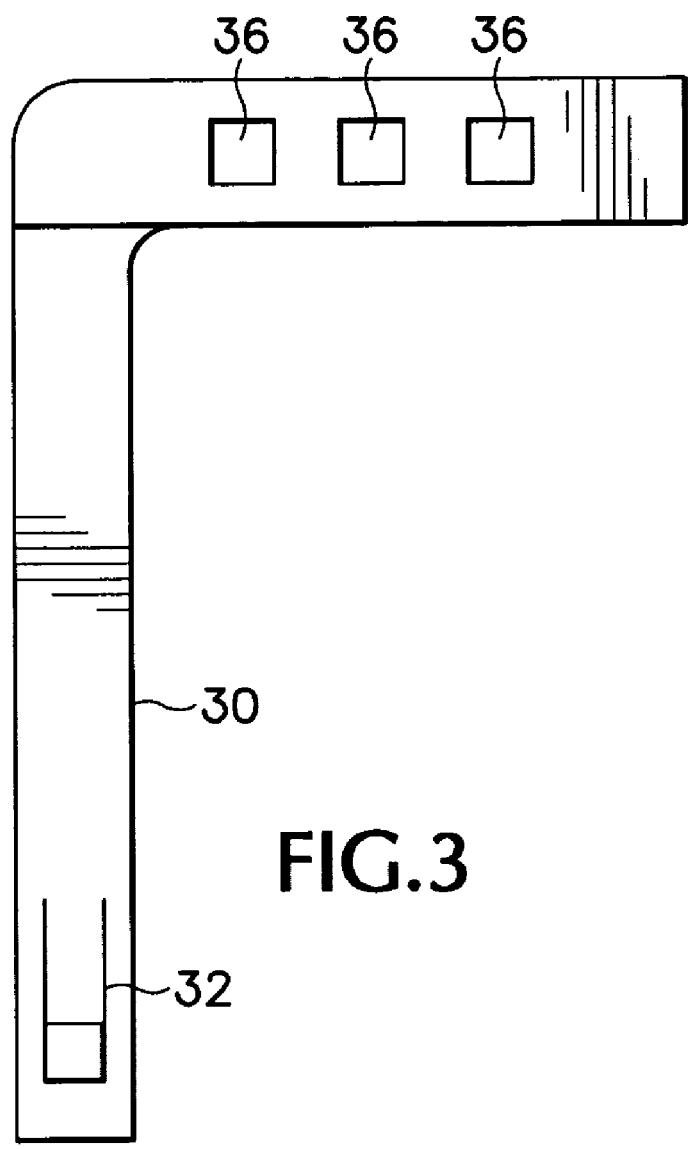
FIG. 3 is a side view of a telescoping frame section component of the beverage holder of FIG. 1.

The telescoping support frame 30, illustrated in FIG. 3, is insertable within the frame 12. Mechanical interference between the adjustment holes 22 and a "locking lug" or retaining clip 32 of the support frame 30 provides a relatively fixed relationship between the lower frame 12 and support frame 30. Vertical adjustment (height) is made by pressing the retaining clip 32 until it sufficiently clears the sides of the particular adjustment hole 22 into which it is inserted. Once cleared, the support frame 30 can be raised or lowered into another adjustment hole as desired. Of course there can be more adjustment holes 22 formed in the frame 12 than illustrated in FIG. 2, which would provide a larger vertical adjustment range. Additionally, there may be retaining clips 33 on each side of the support frame 30 that also mate with respective adjustment holes 22 formed on the other side of the lower frame 12.

In other embodiments, the support frame 30 may be integrated with the lower frame 12 as a single piece, or they may be formed as separate pieces, but locked together in a fixed, non-adjustable combination.

Figure 4:
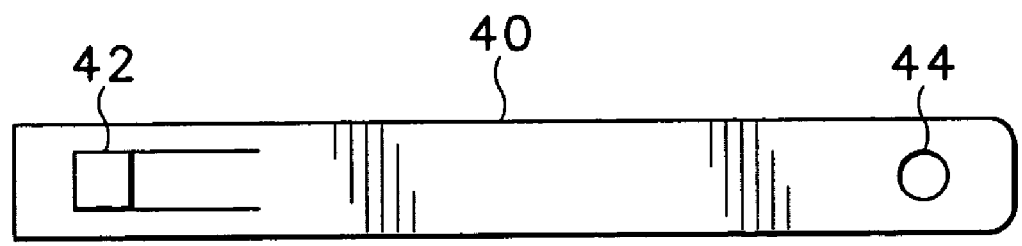
FIG. 4 is a side view of another telescoping frame section component of the beverage holder of FIG. 1.

With reference to FIG. 4, the telescoping cup supports 40 insert within openings of the support frame 30. Similar to that described above, the cup support 40 includes a retaining clip 42 that creates a mechanical interference with adjustment holes 36. The support 40 can be horizontally adjusted using the same procedure as the vertical adjustment described above.

Also as described above, the cup supports 40 need not be adjustable within the support frame 30, and may be integrated as a single piece, or may be separate pieces but fixed in a non-moving relationship.

Referring back to FIG. 1, the telescoping cup supports 40 are inserted within the "Y" arms of the support frame 30. Therefore, each of the separate telescoping cup supports 40 may include the retaining clip 42 to allow for horizontal adjustment.

Figure 5A:
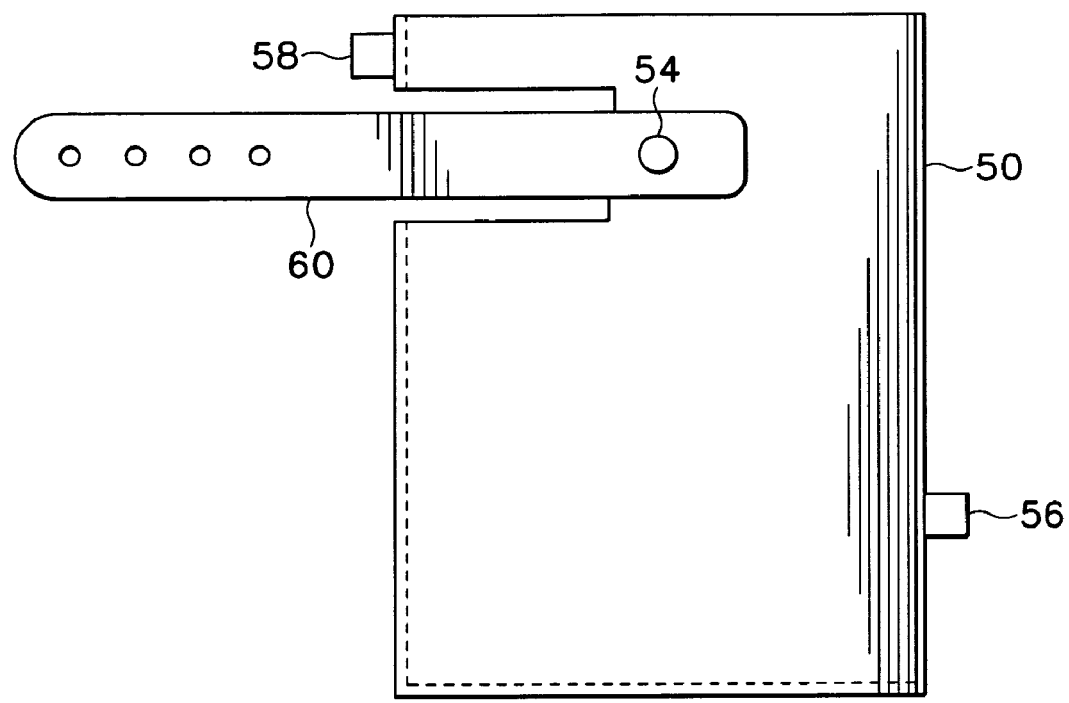
FIG. 5A is a side view of a swiveling cup component of the beverage holder of FIG. 1.
Figure 5B:
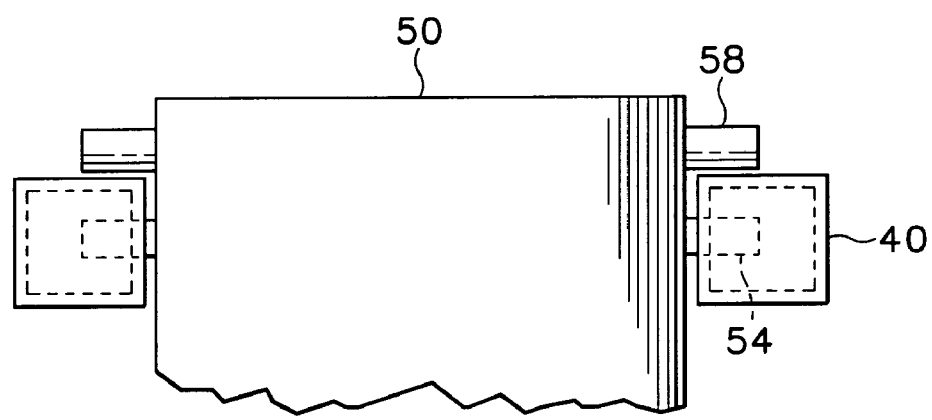
FIG. 5B is a sectional end view of the swiveling cup of FIG. 5A.

FIGS. 1, 5A and 5B illustrate how the holder 10 supports the swiveling cup 50. In particular, the swiveling cup 50 includes a pair of pivot pins 54 that insert into respective holes 44 in the telescoping cup supports 40 (FIG. 4). In some embodiments, the holes 44 are formed approximately one-half inch from the end of the cup supports 40. Also in some embodiments, the cup supports 40 must be biased outward to clear the outside diameter of the swiveling cup 50 and accept the pivot pins 54. The inward bias of the Y arms of the support frame 30 maintains the swiveling cup 50 in a pivotally attached relationship with the holder 10.

When assembled, the swiveling cup 50 pivots about the pivot pins 54. When viewing the swiveling cup 50 in the holder 10 as illustrated in FIG. 5A, rotation about the pivot pins 54 can be either clockwise (toward the user), or counter-clockwise (away from the user). By placing the pivot pins 54 near the top of the swiveling cup 50 (and thus above the center of gravity of the cup), the cup tends to right itself when no force is pushing on it.

Two stops 56, 58, provide limits to the amount of rotation of the swiveling cup 50. When rotated in either direction too far, one of the stops 56, 58, meets with the cup supports 40, which prevents further rotation. The upper stop 58 may be located on the cup 50 such that it meets with the cup supports 40 when the top of the swiveling cup 50 is horizontal or nearly horizontal. In some embodiments, the lower stop 56 may be attached to the swiveling cup 50 approximately ¾ the way down from the top of the cup. Such arrangements allow the swiveling cup to rotate approximately 95 degrees from normal before the lower stop 56 meets with the cup support 40. Having the stops 56, 58 also prevents one from "spinning" the swiveling cup 50 about its pivots, which could be a safety issue for small children.

Additionally, a strap 60 may be provided, mounted at a first end to one of the pivot pins 54. After a beverage container is placed in the swiveling cup, the strap 60 can be wrapped around the container and secured on the other pivot pin 54 by one of the program holes formed in the strap 60. Having multiple different holes allows the swiveling cup 50 to accommodate a variety of beverage containers.

Conveniently, the swiveling cup 50 may be made of plastic, or any other appropriate material. In a particular embodiment, the swiveling cup 50 has an approximate 3" inner diameter, which accommodates a large majority of drink containers, and in particular most sizes of baby bottles. Other example dimensions of the swiveling cup include a 4" depth. In some embodiments, the swiveling cup 50 may include a hole, for example having a diameter of approximately 2¼" formed in the center of the bottom of the swiveling cup 50. This allows bottles that are taller than the height of the swiveling cup 50 to pass through the bottom of the swiveling cup. In these cases, the retaining strap 60 can hold the bottle in place by wrapping around the outside surface of the bottle and attaching to both of the swivel pins 54. The swiveling cup 50 may have a slot cut on the side nearest the support frame 30 that allows for such a holding of the bottle.

Figure 6:
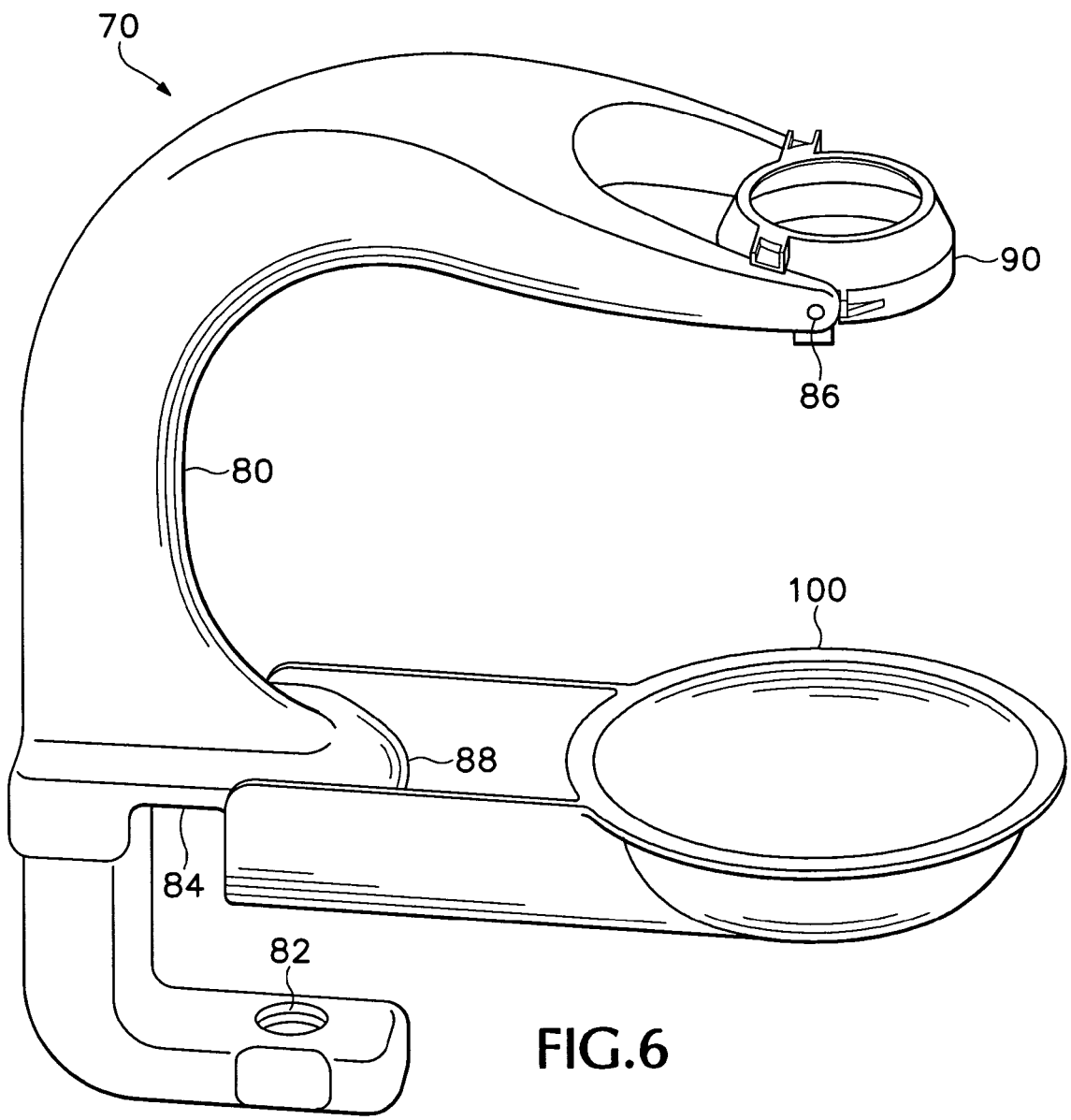
FIG. 6 is an isometric view of a swiveling beverage holder according to other embodiments of the invention.

FIG. 6 is an isometric view of a beverage holder according to other embodiments of the invention, generally indicated at 70.

With reference to FIG. 6, the major components of the holder 70 include a frame assembly 80, a swiveling collar 90, and a bowl attachment 100. Individual components and the interaction of the components are described in more detail below.

In operation, the holder 70 is mounted to a support (not shown), such as a table, tray, stroller, or any other acceptable support. Unlike the holder 10 of the embodiments described above, the frame assembly 80 of holder 70 does not have any provision for vertical or horizontal adjustment, but that of course does not prohibit other embodiments from having those adjustments.

The swiveling collar 90 is mounted in the holder 70, and in these particular embodiments the swiveling collar 90 is configured to support an infant's or toddler's bottle (not shown). In other embodiments of the invention, the swiveling collar may be configured to support another type of beverage container. When the swiveling collar 90 is supporting a bottle, it may pivot due to the placement of swivel pins so that the swiveling collar 90 and the bottle it supports returns to a normal, upright position when no forces are pushing on it. As in the other embodiments, it is envisioned that the bottles or beverage containers are moveable or portable and may be inserted into the swiveling collar 90 of the holder 10.

As illustrated in FIG. 6, the frame assembly 80 includes a threaded hole 82. Similar to the other embodiments that were described above, the threaded hole 82 is configured to accept a bolt (not shown), which may be tightened to firmly attach the frame assembly 80 to a surface of a table, tray, stroller, etc. A channel 84 allows the frame assembly 80 to be mounted over a surface having a lip, such as a tray attachment of a high chair. The bolt permits full vertical adjustment for different surface depths. In these embodiments, the bolt will normally be located below the surface to which the frame assembly 80 is attached, thus the bolt is typically inaccessible to the user of the beverage holder. The frame assembly also includes a clamping arm 88, which works cooperatively with the bolt to affix the frame assembly to the chosen surface.

Figure 7A:
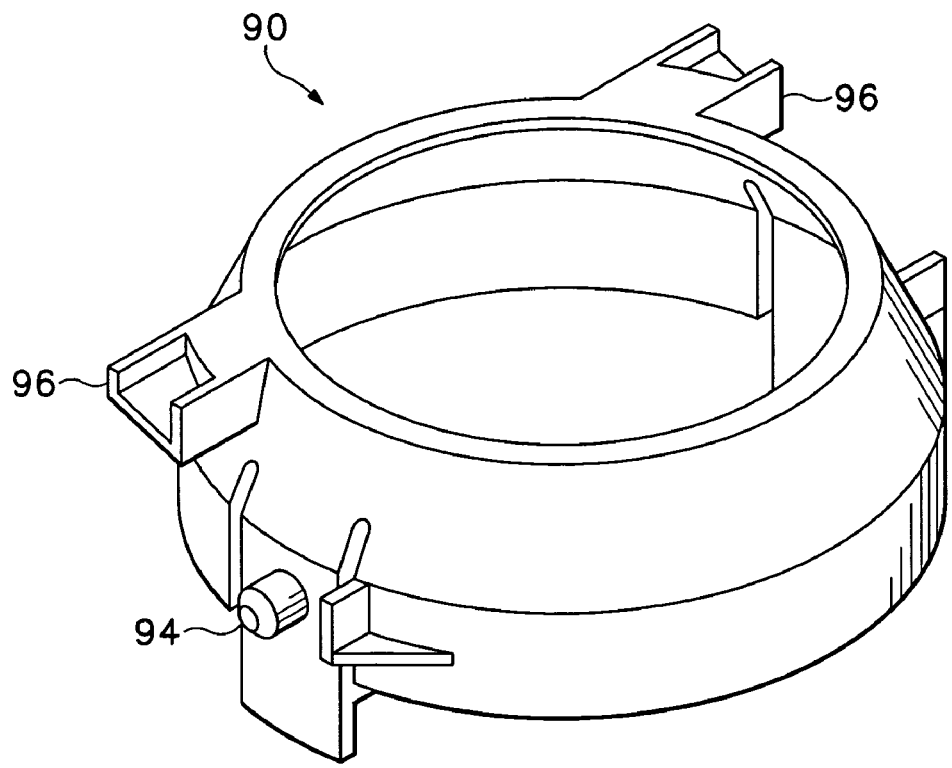
FIG. 7A is an isometric view of a swiveling collar component of the beverage holder of FIG. 6.
Figure 7B:
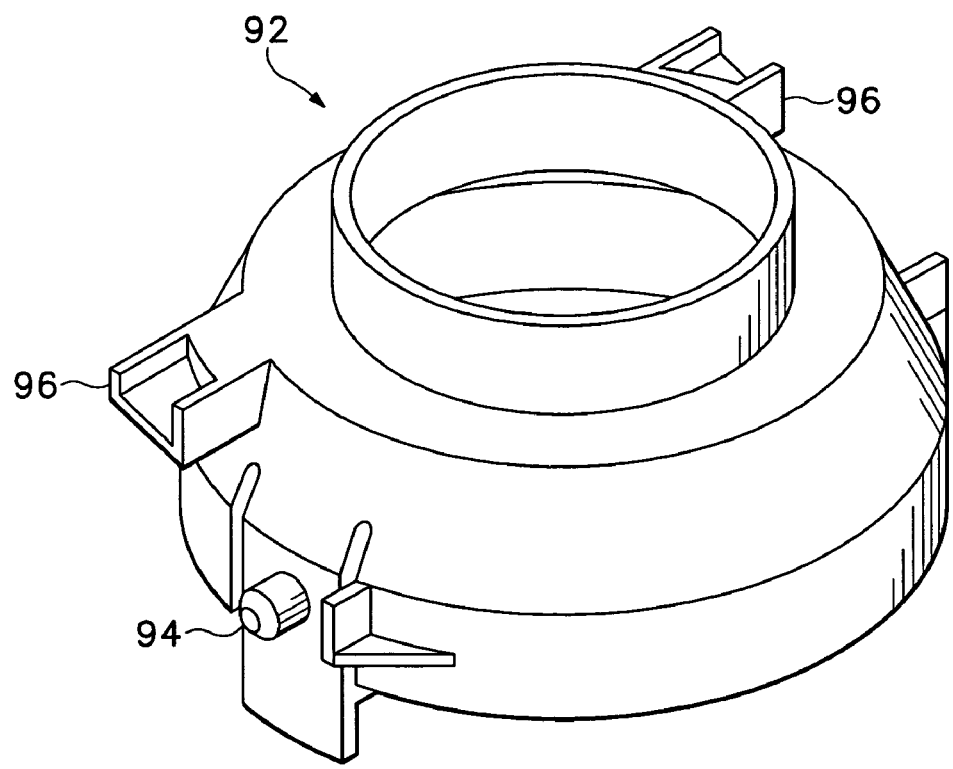
FIG. 7B is an isometric view of another swiveling collar component that is compatible with the beverage holder of FIG. 6.

FIG. 7A is an isometric view of a swiveling collar component 90 of the beverage holder of FIG. 6. FIG. 7B is an isometric view of another swiveling collar component 92 that is compatible with the beverage holder of FIG. 6.

FIGS. 6, 7A, and 7B illustrate how the holder 70 supports the swiveling collars 90, 92. In particular, the swiveling collars 90, 92 include a pair of pivot pins 94 that insert into corresponding holes 86 in the frame assembly 80 (FIG. 6). The inward bias of the Y arms of the frame assembly 80 maintains the swiveling collars 90, 92 in a pivotally attached relationship with the holder 70.

As was mentioned above, the swiveling collars 90, 92 are configured to support infant's or toddler's bottles. The general design of such bottles is well-known, and only a very minimal explanation will be given here. The bottle itself is generally cylindrical, with screw threads located about an opening of the bottle. A nipple is generally held tightly against the top of the bottle by a ring that is designed to cooperatively mate with the bottle. The rings generally have screw threads that are designed to cooperatively mate with the screw threads on the bottle, thus holding the bottle/ring/nipple arrangement in place. Generally speaking, at the bottle/ring interface there is a significant variation in the overall diameter of the bottle, and the swiveling collars 90, 92 according to these embodiments of the invention are configured to support the bottle by taking advantage of the resulting protrusion. In order to attach the bottle to the swiveling collars 90, 92 the upper end of the bottle is inserted through the lower, wider end of the swiveling collar. Then, the nipple and collar may be attached to the bottle as usual. The collar, however, now prevents the bottle from sliding back through the swiveling collars 90, 92.

As is illustrated in FIGS. 7A and 7B, although the diameters of the lower end of the swiveling collars 90, 92 are approximately the same, the diameters of the upper end are substantially different. Furthermore, the rate at which the diameters of the two swiveling collars 90, 92 change between the lower end and the upper end are different. Thus, the two exemplary swiveling collars 90, 92 illustrated in FIGS. 7A and 7B may be designed to fit only a particular manufacturer's brand of bottle. Alternatively, exemplary swiveling collars according to other embodiments of the invention could be made to fit a variety of different manufacturer's bottles, assuming that those bottles all had similar physical characteristics. Thus, according to some embodiments of the invention, the swiveling collars are designed to support many popular varieties of beverage containers by ensuring that the bottle may be inserted into the swiveling collar when the ring is not attached, but also that the bottle is prevented from slipping out of the swiveling collar when the ring is attached to the bottle.

When assembled, the swiveling collars 90, 92 pivot about the pivot pins 94. When viewing the swiveling collar 90 in the holder 70 as illustrated in FIG. 6, rotation about the pivot pins 94 may be either clockwise (toward the user), or counter-clockwise (away from the user). Because the center of gravity of the bottle and the swiveling collar 90 is physically located below the swiveling collar, the swiveling collar/bottle assembly tends to right itself when no force is pushing on it.

A pair of stops 96 provides a limit to the amount of rotation of the swiveling collar 90. When rotated in either direction too far, the stops 96 meet with the frame assembly 80, which prevents further rotation. As illustrated in FIG. 6, the stops 96 essentially prevent the swiveling collar from being rotated away from the user. When a bottle is inserted in the swiveling collars 90, 92, the bottom of the bottle will generally impinge upon the frame assembly 80 at some point, which prevents further rotation of the bottle in the direction toward the user. Preferably, the swiveling collars 90, 92 allow the bottle to be tilted downward with respect to the horizontal plane while simultaneously retaining the bottle and preventing it from falling from the swiveling collar.

Conveniently, the swiveling collars 90, 92 may be made of plastic, or any other appropriate material.

Figure 8:
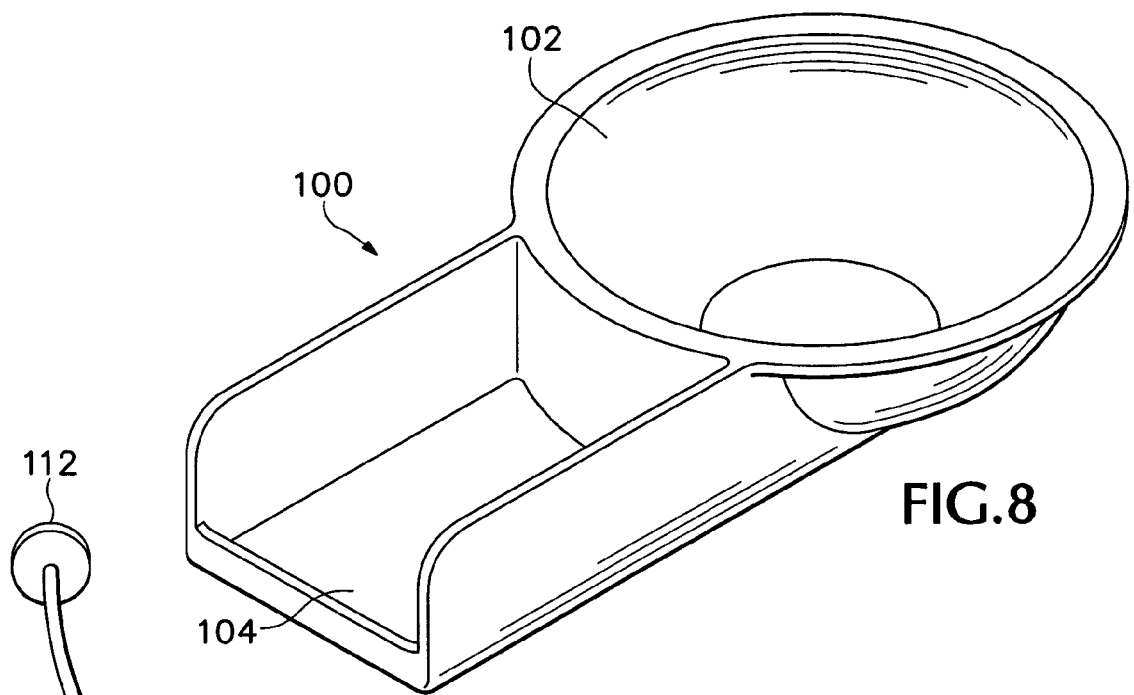
FIG. 8 is an isometric view of a bowl attachment component compatible with the beverage holder of FIG. 6.

FIG. 8 is an isometric view of a bowl attachment component 100 of the beverage holder illustrated in FIG. 6. Preferably, as illustrated in FIG. 8, the bowl attachment 100 is a single, integrated piece of plastic or any other appropriate material, generally consisting of a bowl 102 and a bowl extension 104. The bowl extension 104 is configured to cooperatively interface with the clamping arm 88, such that when the clamping arm is inserted inside the bowl extension, tightening the bolt in the manner that was described above serves to firmly affix both the frame assembly 80 and the bowl attachment 100 to the chosen surface. Thus, according to the embodiments illustrated in FIG. 6, a user of the beverage holder 70 may also eat food from the bowl 102 without fear that the bowl will be dropped on the floor.

Figure 9:
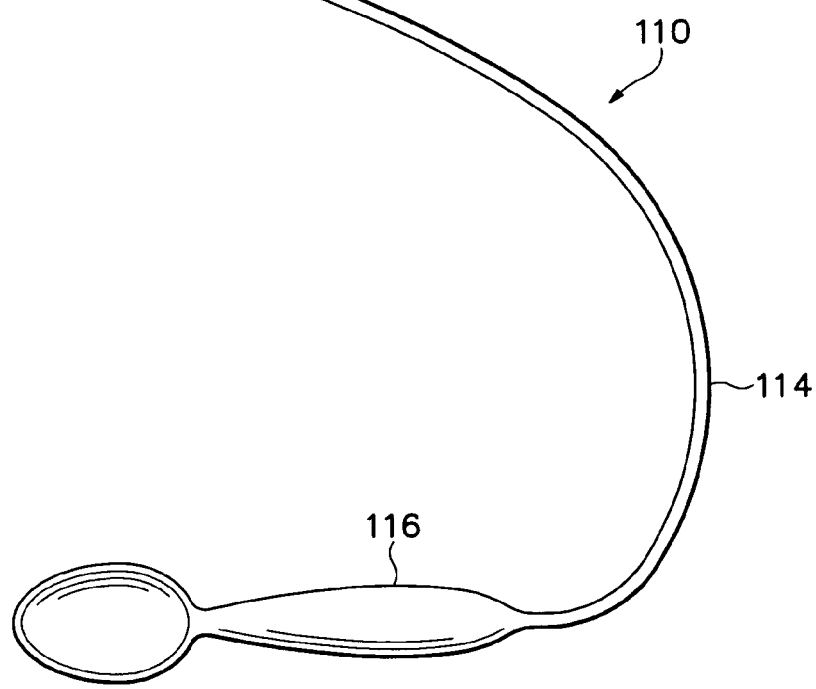
FIG. 9 is a plan view of a spoon attachment component compatible with the beverage holder of FIG. 6.

According to alternative embodiments of the invention, a beverage holder may also include attachments for eating utensils such as forks, knives, and spoons. FIG. 9 is a plan view of a spoon attachment component 110 that is compatible with the beverage holder of FIG. 6.

The spoon attachment component 110 is preferably composed entirely of a flexible plastic material, such as polyethylene, although other materials could easily be used. The spoon attachment 110 includes an attachment disk 112, a leash 114, and a spoon 116. As will be explained in further detail below, the attachment disk 112 cooperates structurally with another component of the beverage holder to detachably affix the spoon 116 to the beverage holder. Each portion of the spoon attachment 110, that is, the attachment disk 112, the leash 114, and the spoon 116 may each have a flexibility that is different from the other portions. For example, it is desirable that the leash 114 be quite flexible in order for a person to manipulate the spoon 116 without difficulty. It is also desirable that the spoon 116 and the attachment disk 12 be less flexible than the leash 114 in order that the spoon may function adequately as an eating utensil and so that the spoon may be safely affixed to the beverage holder.

Figure 10:
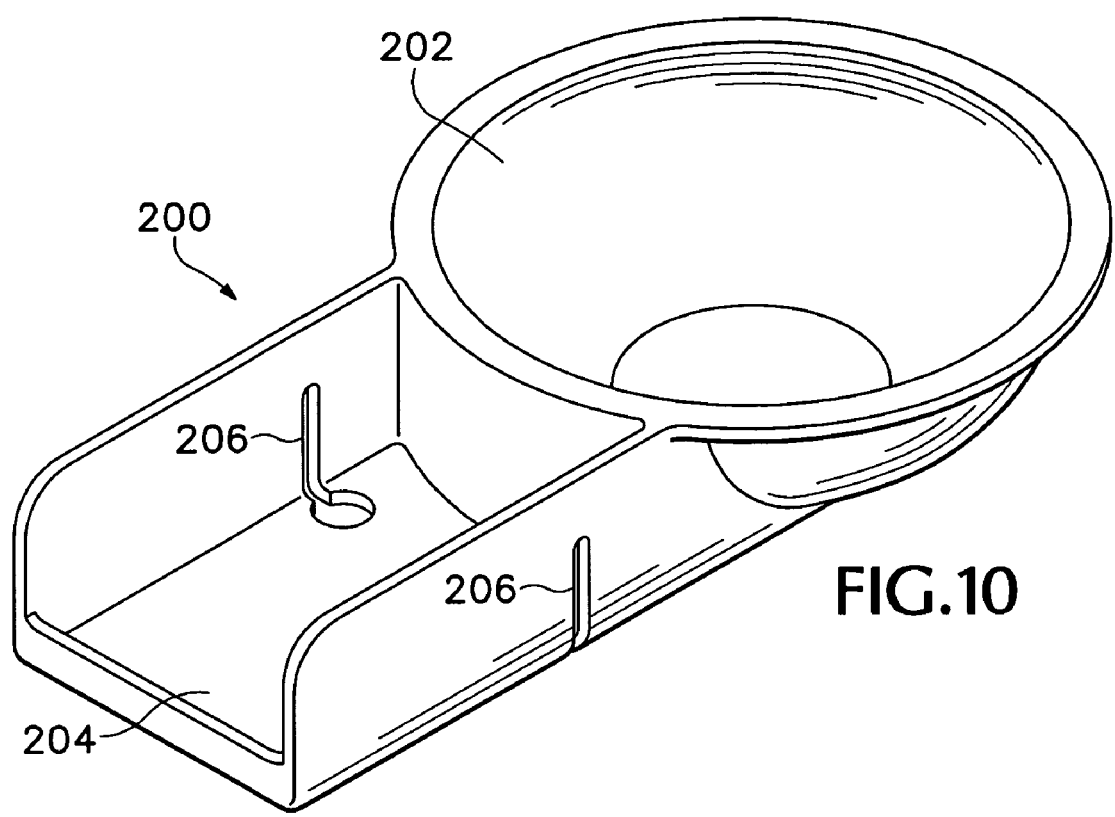
FIG. 10 is an isometric view of another bowl attachment component that is compatible with the beverage holder of FIG. 6 and the spoon attachment component of FIG. 9.

FIG. 10 is an isometric view of another bowl attachment component 200 that is compatible with the beverage holder of FIG. 6 and also compatible with the spoon attachment component of FIG. 9. Like the bowl attachment component 100 of FIG. 8, the bowl attachment 200 is a single, integrated piece of plastic or any other appropriate material, generally consisting of a bowl 202 and a bowl extension 204. In addition, the bowl attachment 200 includes a pair of slots 206 disposed on the bottom and sides of the bowl extension 204. Referring to FIGS. 9 and 10, the portion of the slot 206 on the bottom of the bowl extension 204 has a circular opening with a diameter that is slightly larger than the circular attachment disk 112 of the spoon attachment 110. Thus, the circular attachment disk 112 may be inserted through the wall of the bowl extension 204 using the slot 206.

Like the bowl attachment 100 of FIG. 8, the bowl attachment 200 may be firmly affixed to the chosen surface using the clamping arm 88 (FIG. 6), the threaded hole 82 (FIG. 6), and the bolt (not shown). If this is done after inserting the circular attachment disk 112 through the slot 206, the spoon attachment 110 is prevented from being pulled back out of the slot. The narrow upper portion of the slot 206 is preferably smaller than the diameter of the attachment disk 112 but larger than the diameter of the leash 114. Thus, the leash 114 may pull the attachment disk 112 along the upper portion of the slot 206, but the spoon attachment 110 is prevented from being pulled from the slot because of the larger diameter of the attachment disk 112 relative to the width of the upper portion of the slot. Although two slots 206 are illustrated in FIG. 10, other embodiments may have more or less.

Accordingly, eating utensils may be detachably affixed to the beverage holder 70. This allows the user of the beverage holder to eat food items in the bowl 202, and prevents the user from throwing those utensils on the floor. It should be apparent that a myriad other ways to attach utensils to the beverage holder 70 exist. For example, the spoon attachment 110 could alternatively be attached to the frame 80 of the beverage holder rather 70 rather than the bowl attachment 200.

Furthermore, although the spoon attachment 110 of FIG. 9 is composed of a single, integral piece of plastic, the individual parts could be separate pieces that are affixed to each other in some conventional fashion.

FIG. 11A is an isometric view of one half (80*a*) of the frame assembly component 80 of the beverage holder of FIG. 6. FIG. 11B is an isometric view of the other half (80*b*) of the frame assembly component 80 of the beverage holder of FIG. 6. FIGS. 9A and 9B illustrate that the frame assembly 80 may be manufactured from components 80*a* and 80*b* which, with the exception of the threads within the threaded hole 82, have mirror symmetry with respect to each other. The two halves 80*a*, 80*b* may, for example, be formed of injection molded plastic and then assembled by affixing the two halves together using any number of conventionally known methods.

Having described and illustrated the principles of the invention in several preferred embodiments, it should be apparent that the invention can be modified in arrangement and detail without departing from such principles. I claim all modifications and variation coming within the spirit and scope of the following claims.

The invention claimed is:

1. A beverage holder comprising:
   a swiveling device structured to retain a beverage container and structured to prevent the beverage container from falling from the swiveling device as the swiveling device is rotated over its entire range of motion, the swiveling device configured to return the beverage container to a substantially upright position when no external force besides gravity is applied to the swiveling device;
   a frame structured to be affixed to a reference point on a substantially horizontal surface and structured to support the swiveling device at a vertical distance above the reference point and at a horizontal distance from the reference point, wherein the swiveling device includes a stop that is configured to substantially prevent a top portion of the beverage container from rotating towards the reference point when the stop contacts the frame, the frame comprising:
      a first arm; and
      a second arm, the first arm and second arm structured to contact the swiveling device, the vertical distance and the horizontal distance defining a location between the first and the second arms; and
   an eating utensil detachably affixed to the frame by a leash.

2. The beverage holder of claim 1, the swiveling device comprising:
   a first pivot pin; and
   a second pivot pin, the first and second pivot pins structured to interface with a first pivot hole and a second pivot hole, respectively, that are located in the first arm and the second arm, respectively.

3. The beverage holder of claim 2, the swiveling device further comprising a stop that is structured to impinge the frame and limit a rotational movement of the swiveling device about a rotational axis that is drawn through the first and second pivot holes.

4. The beverage holder of claim 2, the swiveling device comprising a swiveling cup structured to support the beverage container around the sides and the bottom of the beverage container.

5. The beverage holder of claim 2, the swiveling device comprising a swiveling collar structured to support the beverage container around the sides of the beverage container.

6. The beverage holder of claim 1, the frame structured to adjust the vertical distance and the horizontal distance while remaining affixed to the reference point.

7. The beverage holder of claim 1, wherein the stop includes an upper stop and a lower stop.

8. The beverage holder of claim 1, the frame comprising a clamping mechanism configured to be detachably affixed to the reference point on the substantially horizontal surface.

9. A beverage holder comprising:
   a swiveling device structured to retain a beverage container and structured to prevent the beverage container from falling from the swiveling device as the swiveling device is rotated over its entire range of motion, the swiveling device configured to return the beverage container to a substantially upright position when no external force besides gravity is applied to the swiveling device;
   a frame structured to be affixed to a reference point on a substantially horizontal surface and structured to support the swiveling device at a vertical distance above the reference point and at a horizontal distance from the reference point, the frame comprising:
      a first arm; and
      a second arm, the first arm and second arm structured to contact the swiveling device, the vertical distance and the horizontal distance defining a location between the first and the second arms; and
   a bowl attachment structured to sit upright on the horizontal surface and structured to be detachably affixed to the frame;
   wherein the swiveling device includes a stop that is configured to substantially prevent a top portion of the beverage container from rotating towards the reference point when the stop contacts the frame.

10. The beverage holder of claim 9, further comprising an eating utensil detachably affixed to the bowl attachment with a leash.

11. A beverage holder comprising:
   a frame configured to be detachably affixed to an object having at least two parallel surfaces;
   a swiveling device that is connected to the frame and configured to rotate about an axis, configured to support a beverage container above the object, and configured to retain the beverage container in all positions of the swiveling device relative to the axis, the swiveling device comprising a swiveling collar having a first upper end with a first diameter and a second lower end with a second diameter larger than the first diameter, the first and second ends configured to hold different diameter portions of the beverage container; and
   an eating utensil detachably affixed to the frame by a leash;
   wherein the swiveling device is configured to return the beverage container to a substantially upright position when no external force besides gravity is applied to the swiveling device, and the swiveling device includes a first pivot pin and a second pivot pin.

12. The beverage holder of claim 11, the frame comprising a clamping mechanism configured to be detachably affixed to the object having at least two parallel surfaces.

13. The beverage holder of claim 12, further comprising a bowl attachment structured to sit upright on one of the at least two parallel surfaces, the bowl attachment having an extension that is configured to be clamped to the one of the at least two parallel surfaces using the clamping mechanism.

14. The beverage holder of claim 11, the frame comprising:
   a first arm; and
   a second arm, the first and second arms disposed substantially parallel to the at least two parallel surfaces, the first and second arms having a first and a second hole, respectively, that are configured to accept the first pivot pin and the second pivot pin, respectively.

15. The beverage holder of claim 11, the swiveling device further comprising a stop configured to limit the rotation of the swiveling device about the axis in a first direction of rotation to maintain an approximate vertical orientation of the beverage container.

16. The beverage holder of claim 13, the frame, the swiveling device, and the bowl attachment consisting of plastic.

17. The beverage holder of claim 11, the swiveling collar configured to hold a top of the beverage container.

18. The beverage holder of claim 15, the stop configured to allow the swiveling device to rotate freely in a second direction of rotation, opposite the first direction of rotation.

19. The beverage holder of claim 1, the frame comprising a clamping mechanism configured to be detachably affixed to the reference point on the substantially horizontal surface.

20. The beverage holder of claim 14, the frame further comprising a clamping mechanism configured to be detachably affixed to the object having at least two parallel surfaces.

* * * * *